US008610653B2

(12) United States Patent
Tashiro et al.

(10) Patent No.: US 8,610,653 B2
(45) Date of Patent: Dec. 17, 2013

(54) LIQUID CRYSTAL DISPLAY PANEL AND LIQUID CRYSTAL DISPLAY DEVICE

(75) Inventors: Kunihiro Tashiro, Osaka (JP); Takahiro Sasaki, Osaka (JP); Takayuki Hayano, Osaka (JP); Toshihiro Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 445 days.

(21) Appl. No.: 12/679,607

(22) PCT Filed: Jun. 5, 2008

(86) PCT No.: PCT/JP2008/060387
§ 371 (c)(1),
(2), (4) Date: Mar. 23, 2010

(87) PCT Pub. No.: WO2009/047932
PCT Pub. Date: Apr. 16, 2009

(65) Prior Publication Data
US 2010/0207864 A1    Aug. 19, 2010

(30) Foreign Application Priority Data
Oct. 11, 2007    (JP) .................................. 2007-265653

(51) Int. Cl.
*G09G 3/36*    (2006.01)
(52) U.S. Cl.
USPC .............................. 345/87; 345/98; 349/130
(58) Field of Classification Search
USPC .................................. 345/87, 98, 7; 349/130
See application file for complete search history.

(56) References Cited

U.S. PATENT DOCUMENTS

| 5,159,476 | A | 10/1992 | Hayashi |
| 5,247,289 | A | 9/1993 | Matsueda |
| 6,930,739 | B2 * | 8/2005 | Takeda et al. ................. 349/129 |
| 7,145,624 | B2 * | 12/2006 | Kubo et al. .................... 349/146 |
| 7,224,422 | B2 * | 5/2007 | Lee et al. ....................... 349/129 |
| 7,224,442 | B2 * | 5/2007 | Kato et al. ....................... 355/75 |
| 7,796,216 | B2 * | 9/2010 | Kubo .............................. 349/86 |

(Continued)

FOREIGN PATENT DOCUMENTS

| JP | 2-176725 | 7/1990 |
| JP | 3-185428 | 8/1991 |

(Continued)

OTHER PUBLICATIONS

U.S. Appl. No. 12/679,108, filed Mar. 19, 2010, entitled "Display Device".

(Continued)

*Primary Examiner* — Bipin Shalwala
*Assistant Examiner* — Afroza Chowdhury
(74) *Attorney, Agent, or Firm* — Nixon & Vanderhye P.C.

(57) ABSTRACT

A liquid crystal display panel and a liquid crystal display device in which a position of a singular point of pinwheel alignment is controlled, thereby suppressing rough-grained image and generation of image retention, and in which the response time is improved. A pair of substrates each include an electrode, at least one of the pair of substrates includes a vertical alignment film and a photopolymerized polymer, the electrode on one of the pair of substrates has such a shape as to provide pinwheel alignment of the liquid crystal molecules upon application of a voltage and is partly provided with openings for surrounding a singular point of the pinwheel alignment and keeping the singular point within the electrode.

14 Claims, 10 Drawing Sheets

(56) References Cited

U.S. PATENT DOCUMENTS

| | | | |
|---|---|---|---|
| 7,907,241 B2* | 3/2011 | Fujita et al. | 349/114 |
| 2001/0020992 A1* | 9/2001 | Takeda et al. | 349/130 |
| 2002/0075436 A1 | 6/2002 | Kubo | |
| 2004/0008172 A1 | 1/2004 | Nakamura et al. | |
| 2004/0041770 A1 | 3/2004 | Kubo | |
| 2004/0155998 A1 | 8/2004 | Kubo | |
| 2005/0140876 A1 | 6/2005 | Kubo | |
| 2005/0219445 A1* | 10/2005 | Kubo | 349/110 |
| 2005/0237463 A1* | 10/2005 | Kubo | 349/139 |
| 2005/0253797 A1* | 11/2005 | Kamada et al. | 345/89 |
| 2005/0254730 A1* | 11/2005 | Shimazaki | 382/309 |
| 2005/0264730 A1* | 12/2005 | Kataoka et al. | 349/114 |
| 2005/0280761 A1* | 12/2005 | Ishii | 349/130 |
| 2006/0012741 A1 | 1/2006 | Mizusako | |
| 2006/0061716 A1 | 3/2006 | Yamaguchi et al. | |
| 2006/0164585 A1* | 7/2006 | Shih | 349/144 |
| 2007/0019120 A1* | 1/2007 | Tasaka et al. | 349/38 |
| 2007/0040780 A1* | 2/2007 | Gass et al. | 345/87 |
| 2007/0103607 A1* | 5/2007 | Hanaoka et al. | 349/38 |
| 2007/0109286 A1 | 5/2007 | Nakamura | |
| 2007/0139594 A1 | 6/2007 | Kubo | |
| 2007/0285603 A1* | 12/2007 | Nakayama et al. | 349/118 |
| 2008/0002076 A1 | 1/2008 | Yagi et al. | |
| 2008/0266499 A1 | 10/2008 | Kubo | |
| 2009/0225247 A1 | 9/2009 | Yagi et al. | |
| 2009/0268116 A1 | 10/2009 | Yagi et al. | |
| 2010/0045917 A1* | 2/2010 | Imai et al. | 349/139 |

FOREIGN PATENT DOCUMENTS

| | | |
|---|---|---|
| JP | 8-114804 | 5/1996 |
| JP | 2001-249340 | 9/2001 |
| JP | 3520376 | 4/2004 |
| JP | 2004-153329 | 5/2004 |
| JP | 3601788 | 12/2004 |
| JP | 2005-189351 | 7/2005 |
| JP | 2005-316211 | 11/2005 |
| JP | 2005-338472 A | 12/2005 |
| JP | 2006-053546 | 2/2006 |
| JP | 2006-084518 | 3/2006 |
| JP | 2006-091059 | 4/2006 |
| JP | 2006-234870 A | 7/2006 |
| JP | 2006-201355 | 8/2006 |
| JP | 2006-330375 A | 12/2006 |
| WO | 2006/064832 | 6/2006 |

OTHER PUBLICATIONS

International Search Report for PCT/JP2008/060387, mailed Jul. 15, 2008.

* cited by examiner

LIQUID CRYSTAL DISPLAY PANEL AND LIQUID CRYSTAL DISPLAY DEVICE

This application is the U.S. national phase of International Application No. PCT/JP2008/060387, filed 5 Jun. 2008, which designated the U.S. and claims priority to Japanese Patent Application No. 2007-265653, filed 11 Oct. 2007, the entire contents of each of which are hereby incorporated by reference.

TECHNICAL FIELD

The present invention relates to a liquid crystal display panel and a liquid crystal display device. More particularly, the present invention relates to a liquid crystal display panel with a wide viewing angle, enhanced display qualities, and the like, and also to a liquid crystal display device including such a panel.

BACKGROUND

LCD devices are most widely used flat panel displays and used in consumer apparatuses such as a personal computer, a word processor, and a cellular phone. A further expansion of its market is expected. The market expansion generates a need of further improving image qualities of the LCD devices. An LCD device with high display performances such as a wide viewing angle, a high contrast ratio, and a high response time is now being researched and developed.

CPA (continuous pinwheel alignment) mode, which is a kind of VA (vertical alignment) mode, is known as a display mode of LCD devices excellent in viewing angle characteristics and the like (for example, refer to Non-patent Document 1). According to VA mode, negative liquid crystals with negative dielectric anisotropy are vertically aligned to substrate surfaces when no voltage or a voltage not larger than a threshold voltage is applied, and the negative liquid crystals are horizontally aligned thereto when a voltage not smaller than a threshold voltage is applied. According to the CPA mode, continuous pinwheel alignment of negative liquid crystals with negative dielectric anisotropy can be provided in each pixel, only by an electrode shape or a combination of an electrode shape and an alignment control projection. For example, in the case when a plurality of sub-pixels are formed in a pixel displaying a single color of red, green, blue, or the like, continuous pinwheel alignment of liquid crystals in adjacent ones of the sub-pixels can be achieved by providing an electrode with an alignment control projection at a position corresponding to the center of sub-pixels of the opposite electrode or by providing an electrode with openings, thereby forming it into a shape for pinwheel alignment at such a position.

Patent Documents 1 to 3 disclose, for example, an LCD element or a LCD display that provides display by pinwheel alignment of liquid crystal molecules interposed between a pair of substrates. According to Patent Document 1, the LCD element includes: a first electrode on one surface; a second electrode facing the first electrode and having openings for dividing a pixel into a plurality of sub-pixels; a vertical alignment film; a liquid crystal layer with negative dielectric anisotropy, interposed between two substrates; and a storage electrode formed in a periphery region surrounding at least the second electrode. In this case, alignment of liquid crystals is controlled by cross-shaped openings of the second electrode, and continuous pinwheel alignment of the liquid crystals from the periphery to the center of the sub-pixel can be achieved upon application of a voltage.

The LCD device of Patent Document 2 has the following configuration: VA liquid crystal layer is arranged between first and second substrates; the first substrate has a first alignment control structure for forming a plurality of domains where pinwheel alignment is achieved upon application of a voltage in the liquid crystal layer; the second substrate has a second alignment control structure in a region facing at least one of the plurality of domains; the first alignment control structure is composed of at least one opening and the body of an electrode (sub-pixel); and the liquid crystal molecules whose alignment is controlled by the at least one opening and the liquid crystal molecules whose alignment is controlled by the body are aligned in a continuous pattern. In this case, the opening is formed in the first substrate, and the second alignment control structure is formed in the second substrate, thereby achieving continuous pinwheel alignment of the liquid crystals from the periphery of the body toward the center upon application of a voltage. The singular point in the body is fixed by the second alignment control structure.

According to the LCD device of Patent Document 3, two substrates each including an electrode and a vertical alignment film are arranged to face each other with a specific space therebetween, and liquid crystals with negative dielectric anisotropy are injected into the space. The LCD device has a singular point control portion that controls alignment of the liquid crystals so that a singular point of the alignment vector is formed at a specific position upon application of a voltage between the electrodes. Using this singular point, the device achieves alignment control of the liquid crystals. In this case, an oblique electric field is generated by forming a projection or an electrode-free region, and thereby the alignment control and the singular point-control are achieved.

A polymer sustained alignment (hereinafter, also referred, to as "PSA") technology is known as a technology of improving a response time or an aperture ratio (for example, refer to Patent Documents 4 and 5). According to the PSA technology, monomers are dispersed into liquid crystals, and under application of a voltage to the liquid crystals, the monomers are photopolymerized, and as a result, polymers are formed on an alignment film surface. These polymers can fix a pretilt angle of the liquid crystals on the alignment film surface.

[Patent Document 1]
Japanese Kokai Publication No. 2006-53546
[Patent Document 2]
Japanese Patent No. 3601788
[Patent Document 3]
Japanese Kokai Publication No. 2001-249340
[Patent Document 4]
Japanese Patent No. 3520376
[Patent Document 5]
Japanese Kokai Publication No. Hei-08-114804
[Nonpatent Document 1]
Masumi Kubo and three others,
"Continuous Pinwheel Alignment (CPA) mode wo motiita ASV-LCD no kaihatsu", Sharp technical report No. 80 on pages 11 to 14, August, 2001.

According to the embodiment of Patent Document 1, the device has no means for controlling a position of a singular point formed at the center of pinwheel alignment. So if the sub-pixel is large, a region where an oblique electrical field is not generated is formed. As a result, the position of the singular point is not stabilized, leading to rough-grained image, generation of image retention, and the like. Thus, the size of the sub-pixel needs to be sufficiently decreased in order to stabilize the position of the singular point. If the size thereof is sufficiently decreased, however, a proportion of an opening in a pixel electrode is increased, resulting in a reduction in transmittance. In such a point, the embodiment of Patent Document 1 has room for improvement.

According to the embodiment of Patent Document 2, the second alignment control structure needs to be formed on the second substrate, which complicates the production steps. The pinwheel alignment and stabilization thereof are both attributed to the same alignment control structure. The device has no structure that can stabilize the pinwheel alignment by itself. So a region where an oblique electric field is not generated is formed in a large sub-pixel in a large-sized display device, resulting in rough-grained image, generation of image retention, and the like. In such a point, the embodiment of Patent Document 2 has room for improvement.

According to the embodiment of Patent Document 3, an oblique electric field is generated by a projection or an electrode-free region, and alignment control and singular point-control are attributed to either one of the two. If the singular point-control portion is pattern-formed to have a large line-width, an oblique electric field is generated in the width direction of the pattern upon application of a voltage. As a result, the liquid crystals are aligned in the width direction of the control pattern. In such a case, the position of the singular point is not stabilized, resulting in flow alignment. This causes rough-grained image or generation of image retention. In such a point, the embodiment of Patent Document 3 has room for improvement. If the line-width is small, an oblique electric field is not so generated and so alignment control force is weak, even if liquid crystals are aligned in an extending direction of the control pattern. For alignment control using only the singular point-control portion, the singular point-control portions need to be closely arranged within the pixel electrode, thereby reducing a space between the singular point-control portions. In this case, the transmittance is reduced. So the embodiment of Patent Document 3 has room for improvement.

SUMMARY OF THE INVENTION

The present invention has been made in view of the above-mentioned state of the art. The present invention has an object to provide an LCD panel and a LCD device where rough-grained image and generation of image retention are suppressed.

The present inventors made various investigations on LCD panels capable of suppressing rough-grained image, generation of image retention, and the like. The inventors noted a method of controlling a singular point of pinwheel alignment. Then, the inventors found the followings. The singular point of the pinwheel alignment is difficult to fix, which often results in flow alignment, when an electrode (e.g., pixel electrode) has a large area, in the cases where no means for controlling the position of the singular point of the pinwheel alignment, as in Patent Document 1, and where pinwheel alignment and stabilization thereof are attributed to one structure, as in Patent Documents 2 and 3. Then, the inventors found the followings. Photopolymerized polymers for regulating alignment of liquid crystals upon application of a voltage are formed on at least one substrate of a pair of substrates, and an electrode on one substrate of the electrodes arranged on the pair of substrates is partly provided with openings for surrounding a singular point of the pinwheel alignment and keeping it within the electrode. Thus, the singular point of the pinwheel alignment can be fixed within the electrode. As a result, rough-grained image, generation of image retention, and the like, can be suppressed. As a result, the above-mentioned problems have been admirably solved, leading to completion of the present invention.

That is, the present invention is a liquid crystal display panel including a pair of substrates and a liquid crystal layer interposed therebetween,
the liquid crystal layer including liquid crystal molecules with negative dielectric anisotropy,
wherein the pair of substrates each include an electrode,
at least one of the pair of substrates includes a vertical alignment film and a photopolymerized polymer,
the electrode on one of the pair of substrates has such a shape as to provide pinwheel alignment of the liquid crystal molecules upon application of a voltage and is partly provided with openings for surrounding a singular point of the pinwheel alignment and keeping the singular point within the electrode. (hereinafter, also referred to as a "first liquid crystal display panel").

The present invention is mentioned in detail below.

The first liquid crystal display panel of the present invention includes a liquid crystal layer containing liquid crystal molecules with negative dielectric anisotropy and a pair of substrates interposing the above-mentioned liquid crystal layer therebetween. The above-mentioned LCD panel provides display by changing a transmittance of light through the liquid crystal layer between the pair of substrates. The above-mentioned pair of substrates are not especially limited, but preferably composed of a color filter substrate including color filters and a TFT (thin film transistor) array substrate including TFTs as a switching element. The liquid crystal molecules with negative dielectric anisotropy are those with a larger dielectric constant in the short-axis direction than that in the long-axis direction.

Each of the pair of substrates includes an electrode, and at least one of the pair of substrates includes a vertical alignment film and a photopolymerized polymer. The electrodes on the substrates facing each other with the liquid crystal layer therebetween become paired to apply an electric field to the liquid crystal layer, thereby changing an alignment state of the liquid crystal molecules in the liquid crystal layer. The vertical alignment film vertically aligns the liquid crystal molecules under no voltage application and it is typically formed on the electrode surface. From viewpoint of more stable vertical alignment, it is preferable that each of the pair of substrates includes the vertical alignment film formed thereon. The photopolymerized polymer regulates alignment of the liquid crystal molecules upon application of a voltage, and it is typically formed on the vertical alignment film surface. It is preferable that each of the pair of substrates include a photopolymerized polymer formed thereon in order to more stabilize alignment of the liquid crystal molecules upon application of a voltage. If the vertical alignment film and the photopolymerized polymer are arranged one each, they may be arranged on the same or different substrates. Thus, the LCD panel of the present invention may include: a liquid crystal layer including liquid crystal molecules with negative dielectric anisotropy; a first substrate and a second substrate including a first electrode and a second electrode, respectively, and interposing the liquid crystal layer therebetween; a vertical alignment film arranged on at least one of the first and second substrates; and a photopolymerized polymer arranged on at least one of the first and second substrates.

In the first LCD panel of the present invention, the electrode on one substrate has such a shape as to provide pinwheel alignment of the liquid crystal molecules upon application of a voltage, and it is partly provided with openings for surrounding a singular point of the pinwheel alignment and keeping it within the electrode. The pinwheel alignment of the molecules upon application of a voltage to the liquid crystal layer permits a multi-domain configuration, but the pinwheel alignment state is hard to stabilize. Particularly when the singular point of the pinwheel alignment (the central point of a disclination region where the alignment vector is out of order) is formed in a region outside the electrode, the position of the singular point is not fixed, which often results in flow alignment. In the present invention, the photopolymerized polymer for regulating alignment of liquid crystals upon application of a voltage is formed on at least one substrate, and the electrode having such a shape as to provide the pinwheel alignment of the molecules is partly provided with openings for surrounding the singular point of the pinwheel alignment and keep it within the electrode. As a result, the position of the singular point of the pinwheel alignment is fixed and the pinwheel alignment can be stabilized. That is, the above-mentioned photopolymerized polymer is arranged in order to regulate alignment of liquid crystal molecules upon application of a voltage, i.e., to regulate the pinwheel alignment. So the photopolymerized polymer has an effect of stably fixing the singular point of the pinwheel alignment. The electrode with the openings locally generates an oblique electric field from the vicinity of the openings upon application of a voltage, thereby aligning the liquid crystal molecules in the vicinity of the opening in a direction different from the pinwheel alignment direction. In addition, the electrode with the openings forms a disclination region where the liquid crystal molecules are aligned in a direction different from the pinwheel alignment direction when the panel is viewed in plane. This disclination region is used as alignment wall, and thereby the singular point of the pinwheel alignment, which is generated by an oblique dielectric field at an end of the electrode, can be fixed within a region surrounded by the openings in the electrode. If at least one of the substrates includes only the openings and no photopolymerized polymer, the singular point of the pinwheel alignment which has been kept in such a manner might not be stably fixed. Further, if at least one substrate includes only the photopolymerized polymer and no openings, the position of the singular point of the pinwheel alignment is fixed irrespective of within or without the electrode (in a flow alignment state), which possibly causes rough-grained image, generation of image retention, due to display light scattering.

The "pinwheel alignment" used herein means such an alignment state that long-axes of the liquid crystal molecules are aligned in a pinwheel pattern with the singular point being the center of the pattern as viewed in the substrate normal direction, and that the long axes thereof are tilted to the substrate surface direction when the panel is viewed from its cross-sectional plane. This alignment state can be provided by generating an oblique electric field between the electrodes. Generally in the pinwheel alignment, the tilt angle of the liquid crystal molecule gradually changes at the center of the electrode and also changes at the vicinity of the end of the electrode. In contrast, the liquid crystal molecules in the other region (between the end to the center of the electrode) are tilt at an almost uniform angle.

The above-mentioned shape for the pinwheel alignment is preferably such a shape as to provide the pinwheel alignment by generating an oblique electric field by an (outer) edge portion of one electrode and the opposite electrode. The electrode shape for the pinwheel alignment is preferably an octagonal shape in view of a reduction in aperture ratio and uniformity of the pinwheel alignment of the above-mentioned liquid crystal molecules, but it may be a circular or another polygonal shape. Examples of an electrode having such a shape for the pinwheel alignment of the liquid crystal molecules include (1) pixel electrodes that are individually formed in respective pixels constituting a display image by partitioning one film constituting an electrode formed in one substrate surface and (2) sub-pixel electrodes that are formed by dividing each of the pixels, each of the sub-pixel electrodes being arranged in a region where one pinwheel alignment is provided. It is preferable that the above-mentioned pixel electrode and sub-pixel electrode become paired with a common electrode that is formed in continuity on the substrate opposite to the substrate where the pixel electrodes and/or the sub-pixel electrodes are arranged. Further, it is preferable that the pinwheel alignment is provided on every pixel electrode or every sub-pixel electrode. A common electrode and the like that is formed in continuity on one substrate is mentioned as the above-mentioned opposite electrode.

The term "singular point" used herein means the central point of a disclination region where alignment vector is out of order. In the present invention, it means that the central point of the pinwheel alignment when the pair of substrates constituting the LCD panel are viewed in the normal direction thereof. In the disclination region where the liquid crystal molecules are aligned in a pinwheel pattern, dark-line regions (regions where a polarization axis azimuth of linearly-polarized light is parallel and perpendicular to tilt azimuths of the liquid crystal molecules) are generated around the singular point.

According to the present invention, the openings are involved in fixing the position of the singular point of the pinwheel alignment, but not involved in the pinwheel alignment itself, and so the openings are arranged differently from the electrode shape for the pinwheel alignment. The above-mentioned openings are arranged so as to surround the singular point of the pinwheel alignment to keep it within the electrode, specifically, surround the singular point in four azimuths different by 90°, or also in five or more azimuths. For example, the openings may be formed in oblique azimuths in addition to the four azimuths, e.g., six or eight azimuths. If a plurality of openings are formed in one electrode, it is sufficient that the plurality of openings surround the singular point of the pinwheel alignment within the electrode. For more stable pinwheel alignment, it is more preferable that the openings surround the singular point of the pinwheel alignment and keep it in the vicinity of the center of the electrode.

The photopolymerized polymer in the present invention is preferably arranged over the entire substrate surface, and thereby the alignment of the liquid crystal molecules begins at the entire substrate surface, specifically, in-plane alignment, can be provided. As a result, even if an area of the pinwheel alignment for one singular point is increased, the alignment can be uniformly controlled, and rough-grained image, generation of image retention, and the like, do not occur. Thus, the photopolymerized polymer of the present invention may be arranged on a liquid crystal layer-side surface of the substrate and in at least a region covering display region of the surface. It is preferable that the photopolymerized polymers are arranged on a surface of the both substrates. According to this, the photopolymerized polymers arranged in the both substrates regulate the pinwheel alignment of the liquid crystal molecules, and so the singular point of the radial alignment can be fixed. As a result, the response time can be improved. It is preferable that the photopolymerized polymer formed on the substrate surface has a thickness of 50 to 500 nm. It is preferable that the area per region where the photopolymerized polymer is arranged is 0.001 to 0.1 $\mu m^2$. Differently from an alignment control projection used in MVA mode and the like, the photopolymerized polymer of the present invention is arranged over the entire substrate surface to fix the liquid crystal alignment upon application of a voltage and further to improve the response time in order to stabilize the liquid crystal alignment.

Preferable embodiments of the first LCD panel of the present invention are mentioned below.

It is preferable that the electrode (an electrode different from the electrode with the shape for the pinwheel alignment) on the other substrate of the pair of substrates is provided with no openings and no alignment control projections (projections for controlling alignment of the liquid crystal molecules) formed, thereon. In the present invention, the openings formed in the electrode on one substrate surround the singular point of the pinwheel alignment to keep it within the electrode, and the polymer formed on the vertical alignment film surface can fix the singular point of the pinwheel alignment. Therefore, even if the electrode on the other substrate has no openings and no alignment control projections formed thereon, the alignment can be stably controlled. As a result, the production steps can be simplified, and the reduction in contrast ratio due to light leakage, possibly caused at a position where the projection is arranged, can be suppressed. It is preferable that the electrode on the other substrate is formed over the entire region facing the above-mentioned electrode arranged on one substrate. Thus, the electrode arranged on the other substrate may be formed in continuity to cover the entire region facing the electrode on one substrate.

It is preferable that the panel further includes gate wirings and source wirings arranged perpendicularly to each other as viewed in plane, the openings surround the center of the electrode in which the openings are formed, and the openings are arranged at azimuths parallel and perpendicular to the gate or source wirings. Specifically, the above-mentioned openings are arranged on both sides with respect to the singular point of the pinwheel alignment and on lines extending from the singular point to the azimuths parallel and perpendicular to the gate or source wirings. According to this, the alignment wall formed by the openings can be uniformly arranged around the center of the electrode. So the singular point of the pinwheel alignment can be more stably controlled, and rough-grained image, generation of image retention can be more suppressed. The term "parallel" used herein does not necessarily mean "completely parallel" and includes "substantially parallel" in view of advantages of the present invention. Similarly, the term "perpendicular" used herein does not necessarily mean "completely perpendicular" and includes "substantially perpendicular" in view of advantages of the present invention. The term "center of the electrode" means the center of the electrode shape when the electrode is viewed in plane.

It is more preferable in the above-mentioned LCD panel that two openings are arranged with the center of the electrode therebetween at azimuth parallel to the gate or source wirings and that other two openings are arranged with the center of the electrode therebetween at azimuth perpendicular to the gate or source wirings. Two openings are arranged in each of the parallel and perpendicular azimuths, and as a result, the reduction in electrode area can be suppressed and the singular point of the pinwheel alignment can be efficiently surrounded by the openings.

It is preferable that the panel further includes gate wirings and source wirings arranged perpendicularly to each other as viewed in plane, the liquid crystal layer has dark-line regions at azimuths where alignment vector of the liquid crystal molecules is parallel and perpendicular to a polarization axis (oscillation axis of electric field vector) of linearly-polarized light, the polarization axis being at 45° or 135° azimuth with respect to the gate or source wirings (at an azimuth at 45° or 135° with respect to the gate or source wirings), and the openings are formed at positions corresponding to a space between the dark-line regions when the panel is viewed in plane. If the electrode has a polygonal or circular shape, formed on a pixel region surrounded by the gate and source wirings basis, the oblique electric field is typically generated along the gate or source wirings, and so at an end of the electrode, most of the liquid crystal molecules are aligned at azimuths parallel and perpendicular to the gate or source wirings. Further, a dark line is generated in regions where the alignment vector of the liquid crystal molecules is at 45° or 135° azimuth with respect to the gate or source wirings. These regions can be regarded as a kind of alignment wall where the liquid crystal molecules in adjacent regions, alignment vectors of which are different, face each other. So by forming the openings at positions corresponding to the space between the dark-line regions, the number of the azimuth where the alignment wall is formed increases. As a result, the position of the singular point of the pinwheel alignment can be more effectively fixed. The singular point of the pinwheel alignment is stabilized when the alignment wall is formed to surround the singular point, but in the space between the dark-line regions, the alignment state tends to become flow alignment state, which might become difficult for the singular point to be stabilized. The opening is formed in the space where the alignment wall is not generated between two dark-line regions, thereby additionally generating a new alignment wall. As a result, the position of the singular point of the pinwheel alignment can be more effectively fixed, and so rough-grained image, generation of image retention can be more suppressed. If a plurality of the dark-line regions are formed, for example, it is more preferable that the opening is arranged between adjacent two dark-line regions so that a distance from the opening to one region and a distance from the opening to the other region are the same. The above-mentioned alignment vector means an azimuth where the liquid crystal molecules are tilted and aligned when the panel is as viewed in plan. The "45° azimuth" means not only completely 45° but also substantially 45' with respect to an object in view of advantages of the present invention. This is also true to the "135° azimuth". In order to achieve that a linearly-polarized light having a polarization axis at 45° or 135° azimuth with respect to the gate or source wirings, it is preferable that two polarizers (polarizing plates) having a polarization axis (oscillation axis of electric field vector) at 45° or 135° azimuth with respect to the gate or source wirings are arranged in cross-Nicol in the panel.

If the dark-line regions are formed spaced apart at 90° around the singular point within one electrode, it is preferable that openings that are arranged in the space between the dark-line regions are spaced apart at 90° around the singular point.

Thus, the above-mentioned LCD panel may have the following configuration: gate wirings and source wirings are arranged perpendicularly to each other as viewed in plane, the liquid crystal layer has a dark-line region including a plurality of dark lines extending at azimuths where alignment vector of the liquid crystal molecules is parallel and perpendicular to a polarization axis of linearly-polarized light, the polarization axis being at 45° or 135° azimuth with respect to the gate or source wirings, and the openings are each arranged in a space between adjacent ones of the dark-lines as the panel is viewed in plane.

It is preferable that the openings are formed in a region other than an end of the electrode. It is more preferable that x/L is 0.2 or larger with a distance from the end of the electrode to the center thereof being L and the shortest distance from the end of the electrode to the end of the opening being x. Further, it is preferable that the shortest distance from the end of the electrode to the outer circumference of the opening is 10 µm or larger. It is preferable that the liquid crystal molecules in the vicinity of the openings are continuously aligned in a Figure-eight type shape to form an alignment wall in order to surround the singular point and keep it within the electrode. It is preferable that the center of the electrode and the end of the opening are separated with a distance large enough for the alignment wall not to influence an oblique electric field generated at the electrode end. If the opening is formed near the end of the electrode, the molecules are uniformly aligned toward the center of the sub-pixel upon application of a voltage, possibly failing to exhibit functions as the alignment wall. Thus, by forming the opening in the region except for the end of the electrode, the alignment wall can be effectively formed.

The above-mentioned openings are formed in the electrode that applies a voltage to the liquid crystal layer and the shape of the openings is not especially limited. It is preferable that the openings have such a shape as to extend toward the center of the electrode in which the openings are formed when the panel is viewed in plane (for example, a rectangular shape). According to this, the alignment wall of the liquid crystals can be more effectively formed, and the position of the singular point can be fixed. If the opening is formed to have such a shape as to extend toward the center of the electrode, the influence on the oblique electric field generated at the electrode end can be minimized. Thus, the alignment wall effective in fixing the singular point of the pinwheel alignment within the electrode while the pinwheel alignment is kept can be formed. Examples of such a shape include a rectangular shape, an elliptical shape, and a trapezoidal shape with a height larger than its upper and lower bases.

It is preferable that the openings have a rectangular (planar) shape with a short side of 5 µm or larger. According to this, when the panel is viewed in plane, an oblique electric field can be generated in the short-side direction, and thereby the liquid crystal molecules are tilted and aligned at an azimuth perpendicular to the tilt azimuth of the liquid crystal molecules in the pinwheel alignment state. That is, the alignment wall of the liquid crystals can be more effectively formed, and the position of the singular point can be fixed. If the opening has a short side with a length of smaller than 5 µm, its width is too small, and so an oblique electric field generated toward the center of the electrode dominantly influences the alignment state. This might result in that the long axis of the liquid crystal molecules is parallel to the tilt azimuth of the pinwheel alignment. In this case, the oblique electric field generated by the structure for the pinwheel alignment and the oblique electric field generated by the openings are in the same direction. Therefore, the liquid crystal molecules are aligned in the same direction, and as a result, the alignment wall might not effectively exhibit its function. The term "rectangular shape" used herein does not necessarily mean a perfect rectangular shape and also means a substantially rectangular shape in view of advantages of the present invention. For example, a rectangular shape with round corners is also mentioned.

It is preferable that the electrode in which the openings are formed is a sub-pixel electrode formed by dividing a pixel electrode. The above-mentioned pixel electrode is an electrode for providing display in one pixel that is a minimum unit constituting a display image, and each pixel electrode displays a single color such as red, green, and blue, for example. The above-mentioned sub-pixel electrode is an electrode in each region formed by dividing the pixel electrode in one pixel into a plurality of regions. Thus, the above-mentioned electrode in which the openings are formed may be a portion divided from the pixel region, i.e., an electrode arranged in a part of the pixel region. It is preferable that the sub-pixel electrodes are separated from each other with an electrode-free region formed therearound. The edge of the sub-pixel electrode and the electrode facing it with the liquid crystal layer therebetween generate an oblique electric field between the electrodes on the pair of substrates. As a result, the pinwheel alignment can be provided on a sub-pixel electrode basis. The respective sub-pixel electrodes may be partly connected to or separated from adjacent another one of the sub-pixel electrodes. According to this, even if each pixel size is large, display in one pixel is performed by a plurality of sub-pixel electrodes, and thereby the liquid crystal alignment even at the end of the pixel can be controlled. In this case, the sub-pixel electrode is provided with the shape for the pinwheel alignment and the electrode-free region is formed around the sub-pixel electrode. So the sub-pixel electrodes (structure for the pinwheel alignment) and the opening for surrounding a singular point of the pinwheel alignment and keeping it within the sub-pixel electrode can be formed simultaneously when the pixel electrode is pattern-formed. So display performances of the device can be improved without increasing the number of production steps. The shape of the edge of the sub-pixel electrode is not especially limited as long as the pinwheel alignment is provided by an oblique electric field generated at the end of the electrode. It is preferable that the edge of the sub-pixel electrode has such a shape as to be parallel to the gate and source wirings in view of preventing a reduction in aperture ratio. From viewpoint of providing uniform pinwheel alignment, it is preferable that the distances from the center of the sub-pixel electrode to the edges of the sub-pixel electrode are uniform. From viewpoint of providing uniform pinwheel alignment and preventing a reduction in aperture ratio, it is preferable that the sub-pixel electrode has an octagonal shape. It is preferable that the liquid crystal molecules on the sub-pixel electrode are continuously aligned in a pinwheel pattern. The present invention is particularly preferable in CPA (continuous pinwheel alignment) LCD panels.

It is preferable that the sub-pixel electrode is formed by dividing a long side of the pixel electrode. According to the first LCD panel of the present invention, display is provided by aligning the liquid crystal molecules in a pinwheel pattern. So it is preferable that the distances from the singular point of the pinwheel alignment to the sub-pixel electrode ends are uniform. By dividing the long-side direction of the pixel electrode to form the sub-pixel electrodes, the distance from the singular point to the sub-pixel electrode can be shortened. It is more preferable that the long side of the pixel electrode is divided into three. The basic unit for display is typically composed of three pixels different in display color, and so in each pixel region, the length of the long side is three times larger than that of the short side. In this case, only the long side of the pixel region is divided into three, and thereby, the distance from the singular point to the end of the electrode can be shortened. According to this, the liquid crystal alignment can be controlled stably also at the pixel end. Thus, the above-mentioned electrode in which the openings are formed may be arranged in a portion formed by dividing the long side of the pixel region.

It is preferable that the photopolymerized polymer is formed by photopolymerizing monomers that have been dispersed into the liquid crystal layer under application of a voltage to the liquid crystal layer. According to this, the photopolymerized polymer that can provide the liquid crystal molecules with a precise and uniform pretilt angle can be formed. The photopolymerized polymer is a polymer obtained by polymerizing monomers with light irradiation. As a way of the light irradiation, the following procedures are mentioned: monomers to be photopolymerized are mixed with liquid crystal materials in advance, and then a voltage is applied to the liquid crystal layer, thereby aligning the liquid crystal molecules at a specific tilt azimuth and at a specific tilt angle, and under this state, the liquid crystal layer is irradiated with light. In such a state, the monomers are photo-polymerized to give photopolymerized polymers capable of providing the liquid crystal molecules with a precise and uniform pretilt angle. The photopolymerized polymers can be formed on the substrate surface by an existing liquid crystal-injecting step, and so it is sufficient that the step of light irradiation under voltage application is additionally performed. The number of production steps can be decreased compared with the case where an alignment control projection and the like are arranged on the substrate. If the alignment control projection is formed, the contrast ratio might be reduced due to light leakage. According to the present invention, in contrast, the monomers that have been dispersed into the liquid crystal layer are photopolymerized under voltage application to form photopolymerized polymers, and so the alignment of the liquid crystal molecules is not disordered and the contrast ratio is hard to reduce. The form of the photopolymerized polymer is not especially limited and it may be a film or particle. The production method of the photopolymerized polymers is not especially limited as long as the photopolymerized polymers in the first LCD panel can exhibit the same advantages as those of the polymers obtained by photopolymerization under voltage application to the liquid crystal layer. The photopolymerized polymer is preferably obtained by polymerizing monomers containing an acryloyl group, a methacryloyl group, or the like.

The present invention is also a liquid crystal display panel including a pair of substrates and a liquid crystal layer interposed therebetween,
the liquid crystal layer including liquid crystal molecules with negative dielectric anisotropy,
wherein the pair of substrates each include an electrode,
at least one of the pair of substrates includes a vertical alignment film and a photopolymerized polymer,
the photopolymerized polymer being formed by photopolymerizing monomers that have been dispersed in the liquid crystal layer under application of a voltage to the liquid crystal layer,
the electrode on one of the pair of substrates has such a shape as to provide pinwheel alignment of the liquid crystal molecules upon application of a voltage and is partly provided with openings for surrounding a singular point of the pinwheel alignment and keeping the singular point within the electrode (hereinafter, also referred to as a "second liquid crystal display panel").

The above-mentioned photopolymerized polymer is a polymer obtained by polymerizing monomers with light irradiation. As a way of the light irradiation, a method in which monomers to be photopolymerized are mixed with liquid crystal materials in advance, and then a voltage is applied between the electrodes, thereby aligning the liquid crystal molecules at a specific tilt azimuth and at a specific tilt angle, and under this state, the liquid crystal layer is irradiated with light. In such a manner, the monomers are photopolymerized to give photopolymerized polymers capable of providing the liquid crystal molecules with a precision and uniform pretilt angle. Specifically, the liquid crystal alignment can be stabilized under voltage application between the electrodes. The photopolymerized polymers can be formed by an existing liquid crystal-injecting step, and so it is sufficient that the step of light irradiation under voltage application is additionally performed. The number of production steps can be decreased compared with the case where an alignment control projection and the like are arranged on the substrate. The production method of the photopolymerized polymers in the second liquid crystal display panel is not especially limited as long as the photopolymerized polymers can exhibit the same advantages as those of the polymers obtained by photopolymerization under voltage application to the liquid crystal layer. According to the present invention, such PSA technology can be preferably employed.

The second LCD panel can exhibit the same advantages as those of the first LCD panel of the present invention because the pair of substrates of the second LCD panel each include an electrode and the electrode on one of the pair of substrates has such a shape as to provide pinwheel alignment of the liquid crystal molecules upon application of a voltage and is partly provided with openings for surrounding a singular point of the pinwheel alignment and keeping it within the electrode.

Preferable embodiments of the second LCD panel are mentioned below.

It is preferable that the electrode on the other substrate of the pair of substrates is provided with no openings and no alignment control projections formed thereon.

It is preferable that the panel further includes gate wirings and source wirings arranged perpendicularly to each other as viewed in plane,
the openings surround the center of the electrode in which the openings are formed, and
the openings are arranged at azimuths parallel and perpendicular to the gate or source wirings.

It is preferable that the panel comprises gate wirings and source wirings arranged perpendicularly to each other as viewed in plane,
the liquid crystal layer has dark-line regions at azimuths where alignment vector of the liquid crystal molecules is parallel and perpendicular to a polarization axis of linearly-polarized light, the polarization axis being at 45° or 135° azimuth with respect to the gate or source wirings, and
the openings are formed at positions corresponding to a space between the dark-line regions when the panel is viewed in plane.

It is preferable that the openings are formed in a region other than an end of the electrode.

It is preferable that the openings have such a shape as to extend toward the center of the electrode in which the openings are formed when the panel is viewed in plane.

It is preferable that the openings have a rectangular shape with a short side of 5 µm or larger.

It is preferable that the electrode provided with the openings is a sub-pixel electrode formed by dividing a pixel electrode, and it is more preferable that that the structure for the pinwheel alignment is composed of an edge of the sub-pixel electrode.

It is preferable that the electrode provided with the openings is a sub-pixel electrode formed by dividing a pixel electrode. It is more preferable that the sub-pixel electrode is formed by dividing a long side of the pixel electrode.

According to these embodiments, the second LCD panel can exhibit the same advantages as in the first LCD panel of the present invention. The various embodiments of the first and second LCD panels, mentioned in the description about the first and second LCD panels, may be appropriately combined.

The present invention is also a liquid crystal display device including the first or second LCD panel. Such an LCD device including the above-mentioned LCD panel has improved liquid crystal alignment, contrast ratio, and response time, contributed to the panel.

According to the LCD panel in accordance with the embodiment of the present invention, the production steps can be simplified because there is no need to arrange an alignment control projection on an electrode on one of a pair of substrates or there is no need to provide an electrode on one of a pair of substrates with an opening. As a result, the liquid crystal alignment can be stabilized, and the contrast ratio and the response time can be improved. In addition, rough-grained image and generation of image retention can be suppressed.

BEST MODES FOR CARRYING OUT THE INVENTION

The present invention is mentioned in more detail below with reference to Embodiments using drawings, but not limited to only these Embodiments.
Embodiment 1
FIG. 1 is a plan view schematically showing a configuration of one pixel of an LCD panel in accordance with Embodiment 1. FIG. 2 is a schematic cross-sectional view taken along line A-B of FIG. 1.

As shown in FIGS. 1 and 2, three sub-pixel electrodes 106a, 106b, and 106c are formed in one pixel region surrounded by gate wirings 108 and source wirings 109, which are arranged to be perpendicular to each other, in a back-side substrate 160x of the LCD panel in accordance with Embodiment 1. The sub-pixel electrodes 106a, 106b, and 106c are arranged so that the long side of the pixel electrode 106x is divided into three. Between each of adjacent ones of the sub-pixel electrodes 106a to 106c, a region free from an electrode is arranged. Liquid crystal molecules can be aligned in a pinwheel pattern at an edge of each of the sub-pixel electrodes 106a to 106c. In each of the sub-pixel electrodes 106a to 106c, two openings 112 are arranged toward the center of the corresponding electrode in each of the long and short side directions of the pixel electrode 106x. In a region corresponding to the sub-pixel electrode 106b, which is a middle one of the three sub-pixels constituting the pixel electrode 106x, a contact hole 110 is formed and this sub-pixel electrode 106b is connected to a drain wiring 103 arranged in a layer lower than the contact hole 110. The sub-pixel electrodes 106a to 106c are formed in continuity with the pixel electrode 106x therebetween.

As shown in FIG. 2, a storage capacitor wiring 101 is arranged on a substrate 100, and thereon, a gate insulating film 102 and a drain wiring 103 are arranged in this order. On the drain wiring 103, an interlayer insulating film 104 is arranged, and thereon, the sub-pixel electrode 106b, and a vertical alignment film 105 are arranged. On the vertical alignment film 105, a photopolymerized polymer 107 is formed. The sub-pixel electrode 106b is connected to the drain electrode 103 through the contact hole 110 formed in the interlayer insulating film 104.

A counter substrate 170x is composed of a color filter 121, a counter electrode 122, and a vertical alignment film 123a, arranged on a substrate 120. On the vertical alignment film 123a, the photopolymerized polymer 107 is formed. A photospacer 111 that regulates the thickness of the liquid crystal layer 130 is arranged in the counter substrate in a part of a region corresponding to the intersection between the gate wirings 108 and the source wirings 109 formed on the back-side substrate 160x.

The size of the pixel region is mentioned with reference to FIGS. 3(a) and 3(b). As shown in FIG. 3(a), the pixel region has a long side (L1) of 300 μm and a short side (L2) of 100 μm, and each of the sub-pixels 106a to 106c has a long side (L3) of 94 μm and a short side (L4) of 91 μm.

As shown in FIG. 3(b), an electrode-free region where the liquid crystal molecules are aligned in a pinwheel pattern upon application of a voltage is formed to have a width (L5) of 9 μm between adjacent ones of the sub-pixel electrodes 106a to 106c. The openings 112 are arranged partly in each of the sub-pixels 106a to 106c so as to surround the singular point of the pinwheel alignment, which is generated at voltage application, and keep it within the corresponding sub-pixel electrode. A distance (L6) from the end of each sub-pixel electrodes 106a to 106c to each opening 112 is 12 μm. Each opening 112 has a rectangular planar shape and has a long side (L7) of 12 μm and a short side (L8) of 5 μm.

A production method of the LCD panel in accordance with Embodiment 1 is mentioned below.

A production method of the back-side substrate 160x is mentioned first. The gate wirings 108 and the storage capacitor wirings 101 are formed on the substrate 100. The gate insulating film 102 is formed on the gate wirings 108 and the storage capacitor wirings 101. Further, a semiconductor layer (not shown) constituting a thin film transistor for pixel switching is formed on the gate insulating film 102. Then, the source wiring 109 and the drain wiring 103 are formed, and thereon, the interlayer insulating film 104 is formed.

The interlayer insulating film 104 is provided with the contact hole 110 for connecting the drain wiring 103 to the pixel electrode 106x by photolithography and the like. Thereon, a transparent conductive film constituting the pixel electrode 106x is formed by sputtering and the like. An indium tin oxide film, an indium zinc oxide film, and the like, may be used as the transparent conductive film, but the material for the film is not limited thereto. Through the contact hole 110, the transparent conductive film and the drain wiring 103 are connected to each other. Then, a resist film is formed on the transparent conductive film by spin coating and patterned into a desired shape. The transparent conductive film is etched into a desired shape using the patterned resist film as a mask to give the pixel electrode 106x. The pixel electrode 106x includes the sub-pixel electrodes 106a, 106b, and 106c each including four openings 112. Then, the vertical alignment film 105 is formed on the pixel electrode 106x. As a result, the back-side substrate 160x is completed.

Next, the counter substrate 170x is mentioned. A black matrix (not shown), the color filter 121, and the counter electrode 122 are successively formed on the substrate 120, and then, the photospacer 111 is formed in a part of a region facing the intersection between the gate wirings 108 and the source wirings 109. The counter electrode 122 is made of a transparent conductive film formed by sputtering and the like. An indium tin oxide film, an indium zinc oxide film, and the like, may be used as the transparent conductive film, but the material for the film is not limited thereto. The counter substrate 170x is completed through the above-mentioned steps.

The vertical alignment films 105 and 123a are arranged on surfaces of the back-side substrate 160x and the counter substrate 170x, respectively. An alignment film material commonly used in a VA LCD panel, such as polyimide, can be used as a material for the vertical alignment films 105 and 123a. Then, the back-side substrate 160x and the counter substrate 170x are attached to each other with a sealing member therebetween to produce a hollow panel. Negative liquid crystals containing 0.3% by weight of methacryloyl group-containing polyfunctional acrylate monomers are injected to the hollow panel, and the panel is sealed.

Then, light is radiated to the panel under voltage application to the liquid crystals in the LCD panel, thereby photopolymerizing the monomers having being dispersed into the liquid crystals. Thus, the photopolymerized polymers 107 for regulating the liquid crystal alignment upon application of a voltage are formed on the surfaces of the vertical alignment films 105 and 123a. At the time before the photopolymerized polymers 107 for regulating the liquid crystal alignment are formed on the surfaces of the vertical alignment films 105 and 123a, the liquid crystal molecules are partly controlled so as to be aligned in a pinwheel pattern, beginning at the electrode-free region for the pinwheel alignment. So rapid increase in applied voltage causes a variation in liquid crystal alignment on the sub-pixel electrodes 106a to 106c. If the photopolymerized polymer is formed under the variation in liquid crystal alignment, the photopolymerized polymers are formed to have such a shape as to disorder the alignment. So a voltage for photopolymerizing the monomers is applied with gradually increasing from a low voltage (0V) to a high voltage (10V) so that the liquid crystal molecules are gradually inclined in a pinwheel pattern toward the center of each sub-pixel electrodes 106a to 106c. As a result, the photopolymerized polymers 107 each having a thickness of 50 to 500 nm and an area of 0.001 to 0.1 $\mu m^2$ are formed by photoirradiation on the vertical alignment films 105 and 123a. Further, polarizing plates and the like are attached to the produced LCD panel of the present invention. Thus, an LCD device of the present invention is completed.

Comparative Embodiment 1

FIG. 4 is a plan view schematically showing a configuration of one pixel of an LCD panel in accordance with Comparative Embodiment 1. FIG. 5 is a schematic cross-sectional view taken along line C-D of FIG. 4. An alignment control projection 124 and a photospacer 111 shown in FIG. 4 are arranged on the counter substrate and other members are arranged on the back-side substrate.

The LCD panel in accordance with Comparative Embodiment 1 shown in FIGS. 4 and 5 has the same configuration as that in Embodiment 1, except for the following points. First, sub-pixel electrodes 106d, 106e, and 106f into which the pixel electrode 106y has been divided in the back-side substrate 160y have no openings. Secondly, an alignment control projection 124 is arranged on a counter electrode 122 in the counter substrate 170y, and thereon a vertical alignment film 123b is arranged. Finally, the photopolymerized polymers 107 are not arranged on the vertical alignment films 105 and 123b.

Comparative Embodiment 2

FIG. 6 is a plan view schematically showing a configuration of one pixel of an LCD panel in accordance with Comparative Embodiment 2. FIG. 7 is a schematic cross-sectional view taken along line E-F of FIG. 6. As shown in FIGS. 6 and 7, the LCD panel in accordance with Comparative Embodiment 2 has the same configuration as in Embodiment 1, except that the photopolymerized polymers are arranged neither on the vertical alignment films 105 nor 123a, the vertical alignment film 105 being formed on a pixel electrode 106z composed of sub-pixels 106g, 106h, and 106l in a back-side substrate 160z, the vertical alignment film 123a being arranged in the opposite substrate 170z.

Evaluation Test of LCD Panel

The LCD panels of Embodiment 1 and Comparative Embodiments 1 and 2 are evaluated for liquid crystal alignment characteristics, a response time, and a contrast ratio in this evaluation test.

Evaluation of Liquid Crystal Alignment Characteristics

The LCD panels were evaluated for liquid crystal alignment characteristics, first. A voltage applied between the pixel electrode to the counter electrode was rapidly changed from 0 to a saturated voltage (6V), and in this manner, the characteristics were evaluated. Under linearly-polarized light, a distribution of an azimuth angle of liquid crystal alignment (elevation angle of a liquid crystal molecule) is mainly observed, and under circularly-polarized light, a distribution of a polar angle of liquid crystal alignment (tilt angle of a liquid crystal molecule) is mainly observed. Under linearly-polarized light, linearly-polarized light having an oscillating plane in a specific azimuth enters the liquid crystals, and so birefrigence changes with an azimuth angle of liquid crystal alignment. Under circularly-polarized light, circularly-polarized light having a circularly rotating oscillating plane, which has passed a retardation plate, enters liquid crystal, and so birefrigence does not change with an azimuth angle but changes with a polar angle of the liquid crystal alignment.

FIG. 8(a) is a plan view schematically showing a configuration of one pixel of an LCD panel in accordance with Embodiment 1, having the same configuration as shown in FIG. 1. A region S in FIG. 8(a) shows an upper-half region of the sub-pixel electrode 106a. FIGS. 8(b) and 8(d) are photographs of pixels in the region S shown in FIG. 8(a) under linearly-polarized light and circularly-polarized light, respectively. FIG. 8(c) is a view showing a relationship between alignment embodiment of liquid crystal molecules under linearly-polarization light and polarization axes of polarizing plates, and also showing brightness in display under such a relationship. FIG. 8(e) is a view showing such a relationship under circularly-polarized light, and also showing brightness in display under such a relationship. A liquid crystal molecule 150 represents an alignment state of liquid crystal and shows that the end of the molecule 150 is directed to the counter substrate side of the panel. The arrows show polarization axis azimuths of the polarizing plates which are arranged on the two substrates constituting the LCD panel, respectively. FIG. 8(f) is a plan view schematically showing an arrangement relationship between a sub-pixel electrode, and a singular point of pinwheel alignment and dark-line regions. As shown in FIG. 8(f), in Embodiment 1, a singular point 152 is formed near the center of the sub-pixel electrode 106a, and dark regions 151 (four dark lines) are generated from the singular point 152 toward four corners of the sub-pixel electrode 106a. In each space between the dark regions 151 (adjacent ones of the dark lines), the opening 112 is formed. The arrangement relationship shown in FIG. 8 is slightly different from that in the photograph in FIG. 8(b) because in FIG. 8(f), the arrangement relationship is schematically shown.

As shown in FIG. 8(c), under linearly-polarized light, a dark line is generated in regions where the polarization axis azimuth is parallel and perpendicular to the alignment azimuth of the liquid crystal molecule 150, and display is bright in a region where the polarization axis azimuth is neither parallel nor perpendicular to the alignment azimuth of the liquid crystal molecule 150. As shown in FIG. 8(e), under circularly-polarized light, brightness does not change with a change of the azimuth angle direction of the molecule 150, and thus, the entire pixel region is bright. In FIGS. 8(b) and 8(d), the middle of the bottom of the photograph, corresponding to the center of the sub-pixel electrode, is defined as X and the upper left corner is defined as Y, and the upper right corner is defined as Z, for convenience of explanation. Also in the below-mentioned FIGS. 9(b), 9(c), 10(b), and 10(c), the positions X, Y, and Z are defined as mentioned above.

FIG. 9(a) is a plan view schematically showing a configuration of one pixel of the LCD panel in accordance with Comparative Embodiment 1. FIGS. 9(b) and 9(c) are photographs of pixel in the region S shown in FIG. 9(a) under linearly-polarized light and circularly-polarized light, respectively. FIG. 10(a) is a plan view schematically showing a configuration of one pixel of an LCD panel in accordance with Comparative Embodiment 2. FIGS. 10(b) and 10(c) are photographs of pixel in the region S shown in FIG. 10(a) under linearly-polarized light and circularly-polarized light, respectively.

In the LCD panel in accordance with Embodiment 1, a dark line is generated along the lines X-Y and X-Z of FIG. 8(b). In the sub-pixel electrodes 106a to 106c, near the region where the openings 112 are formed, a Figure-eight type disclination region is formed to generate a dark line so that the alignment azimuths of the molecule are respectively parallel and perpendicular to the polarization axis azimuths of the polarizers (polarizing plates) arranged in cross-Nicol. The dark lines are generated at 45° and 135° azimuths with respect to the gate wirings or the source wirings. The dark line and the dark portion are periodically positioned, which shows that the alignment of the liquid crystal molecules in the azimuth angle direction (the alignment azimuth) is periodically distributed. As shown in FIG. 8(d), under circularly-polarized light, a region where the openings 112 are formed in the sub-pixel electrodes 106a, 106b, and 106c is slightly dark, but rough-grained image caused by light scattering is not generated. This shows that the liquid crystal alignment in the polar angle direction is stabilized.

According to the LCD panel in accordance with Comparative Embodiment 1, dark lines are generated along lines X-Y and X-Z in FIG. 9(b), and a dark portion spreads also into a space between these dark lines, which shows that the liquid crystal molecules in the azimuth angle direction are disorderly aligned in the space between the dark lines. As shown in FIG. 9(c), under circularly-polarized light, rough-grained image is generated by scattering in the space between the line X-Y and the line X-Z, which shows that the liquid crystals in the polar angle direction in the space are disorderly aligned. This is caused because, the sub-pixel electrodes 106d to 106f are large in size and therefore an oblique electric field generated by the alignment control projection 124 has small influences in the space.

According to Comparative Embodiment 2, dark lines are generated along the lines X-Y and X-Z of FIG. 10(b), and a dark portion spreads into a space between these dark lines. This shows that the liquid crystal molecules in the azimuth angle directions are aligned disorderly. As shown in FIG. 10(c), rough-grained image due to light scattering is generated under circularly-polarized light in the space. This shows that the liquid crystal molecules in the polar angle directions are also disorderly aligned in the space.

The above-mentioned results show the followings. According to Embodiment 1, the Figure-eight type disclination region formed by the openings 112 functions as an alignment wall, and the singular point of the pinwheel alignment is kept within each of the sub-pixels 106a to 106c. Further, the photopolarized polymers 107 formed on the vertical alignment films 105 and 123a fix the singular point of the pinwheel alignment. Thus, the liquid crystal alignment in Embodiment 1 is more stable than that in Comparative Embodiments 1 and 2. Even though the Figure-eight type disclination region is formed under linearly-polarized light, the rough-grained image due to light scattering is not generated under circularly-polarized light. This is because a variation (φ-variation) in liquid crystal alignment in an azimuth angle (φ) direction is relatively smaller than that in Comparative Embodiments 1 and 2.

The φ-variation in the Figure-eight type disclination region is 90° in Embodiment 1, and that in the space is 135° in Comparative Embodiment 1. The liquid crystal molecules can be continuously tilted at an azimuth of the synthesized alignment vector when the φ-variation is small, but it becomes difficult when the φ-variation is large. If regions where the molecules are not continuously tilted (e.g., regions where rough-grained image occurs, shown by a circle in FIGS. 9(c) and 10(c)) locally exist, light is scattered because a change of a refractive index at the interface of the regions, resulting in rough-grained image. In Comparative Embodiment 2, the Figure-eight type disclination region is formed to surround the singular point of the pinwheel alignment to keep it within the sub-pixel electrode, but the singular point is not fixed because of the absence of the photopolymerized polymers. As a result, it is shown that the φ-variation is increased under the influence of the Figure-eight type disclination region.

Evaluation of Response Time

The LCD panels of Embodiment 1 and Comparative Embodiments 1 and 2 were evaluated for response time. The evaluation was made based on a total time of a rise time (τr) when the transmittance of the panel is changed from 10% to 90% and a fall time (τd) when the transmittance of the panel is changed from 90% to 10%. The following Table 1 shows the measurement results.

TABLE 1

| Response time (ms) | Embodiment 1 | Comparative Embodiment 1 | Comparative Embodiment 2 |
|---|---|---|---|
| τr | 12 | 143 | 204 |
| τd | 10 | 12 | 18 |
| τr + τd | 22 | 155 | 222 |

As shown in Table 1, according to Embodiment 1, the response time is lower than those in Comparative Embodiments 1 and 2, and particularly a difference in the rise time (τr) is markedly observed. According to Embodiment 1, uniform alignment control can be provided because of the following embodiment: the openings 112 arranged in each sub-pixel electrodes 106a to 106c surround the singular point of the pinwheel alignment to keep it within the corresponding electrode; and further, the photopolymerized polymers 107 are formed on the surfaces of the vertical alignment films 105 and 123a, thereby providing plane alignment, beginning at the whole plane where the photopolymerized polymers 107 are formed. Thus, the position of the singular point can be fixed even if the size of the sub-pixel is large. As a result, the liquid crystal alignment is stable, and the response time is significantly improved compare to those in Comparative Embodiments 1 and 2.

According to Comparative Embodiment 1, the alignment is partly controlled, beginning at the projection 124. So as the sub-pixel size is increased, the liquid crystal alignment variation (φ-variation) in the azimuth angle (φ) direction is increased in the space between dark-line regions of the pinwheel alignment, and so it takes a longer time for the molecules to rise to be in a flat state, in comparison to Embodiment 1. According to Comparative Embodiment 2, the singular point of the pinwheel alignment is surrounded and kept within each sub-pixel electrode 106g, 106h, and 106i by openings 112 formed therein. However, the liquid crystal molecules are aligned only by the oblique electric field generated by the shape of the electrodes 106g to 106i, and further, the beginning point of the alignment control is not formed. As a result, the rise time (τr) is longer than that in Comparative Embodiment 1.

Evaluation of Contrast Ratio

The LCD panels of Embodiment 1 and Comparative Embodiments 1 and 2 were evaluated for contrast ratio. The evaluation was made based on a ratio in luminance between black state and white state.

The contrast ratios in the panels in Embodiment 1 and Comparative Embodiment 2 were 900 and that in the panel in Comparative Embodiment 1 was 600. Thus, the contrast ratio is more improved in Embodiment 1 and Comparative Embodiment 2, compared with Comparative Embodiment 1. This is because the alignment control projection is not formed in Embodiment 1 and Comparative Embodiment 2 and therefore light-leakage, which is caused when the projection 124 is arranged as in Comparative Embodiment 1, is not generated.

However, in Comparative Embodiment 2, the projection is not arranged in the opposite region, and so the contrast ratio is improved compared with Comparative Embodiment 1. However, the position of the singular point of the pinwheel alignment is not stabilized, which causes rough-grained image, generation of image retention by display light scattering.

The above-mentioned results show that the LCD panel in Embodiment 1 can suppress rough-grained image and generation of image retention and provides a high response time.

The present application claims priority to Patent Application No. 2007-265653 filed in Japan on Oct. 11, 2007 under the Paris Convention and provisions of national law in a designated State, the entire contents of which are hereby incorporated by reference.

Explanation Of Numerals And Symbols

Figure 1:
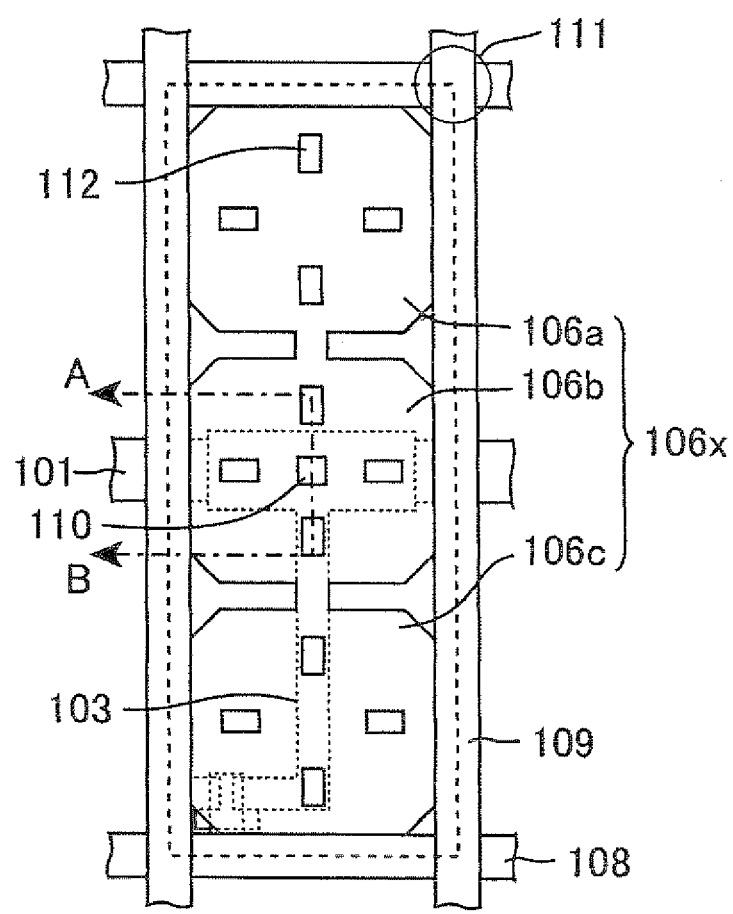
FIG. 1 is a plan view schematically showing a configuration of one pixel of an LCD panel in accordance with Embodiment 1.
Figure 2:
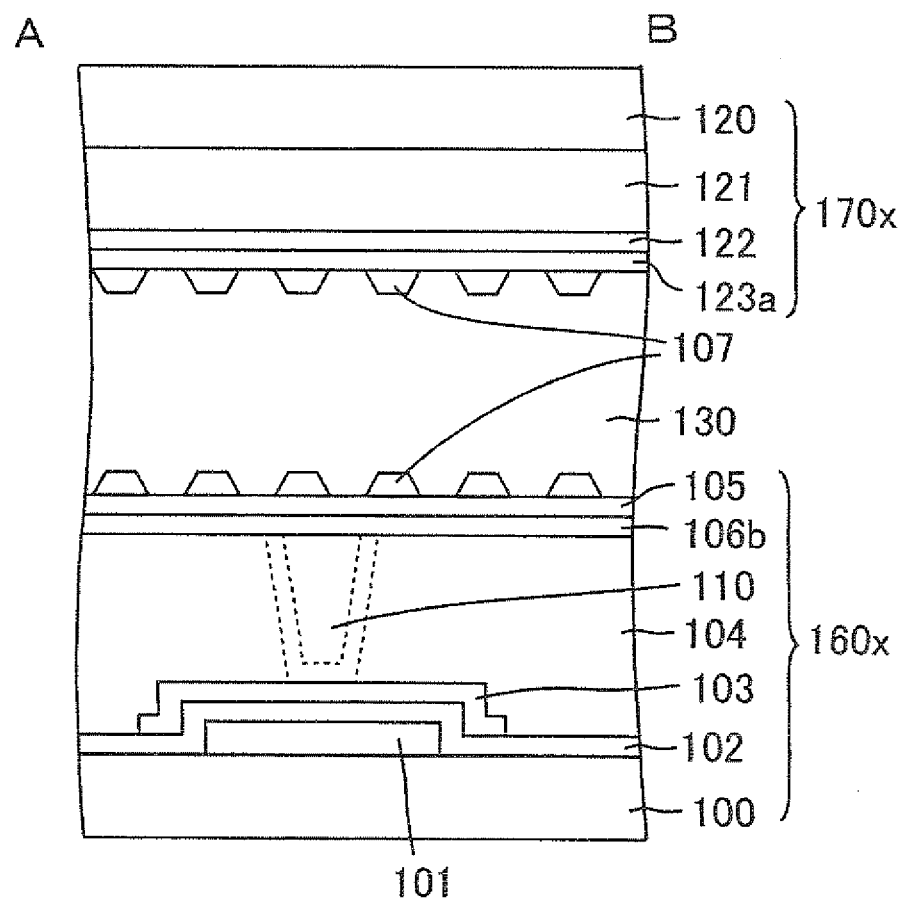
FIG. 2 is a cross-sectional view schematically showing a configuration of the LCD panel in accordance with Embodiment 1.
Figure 3:
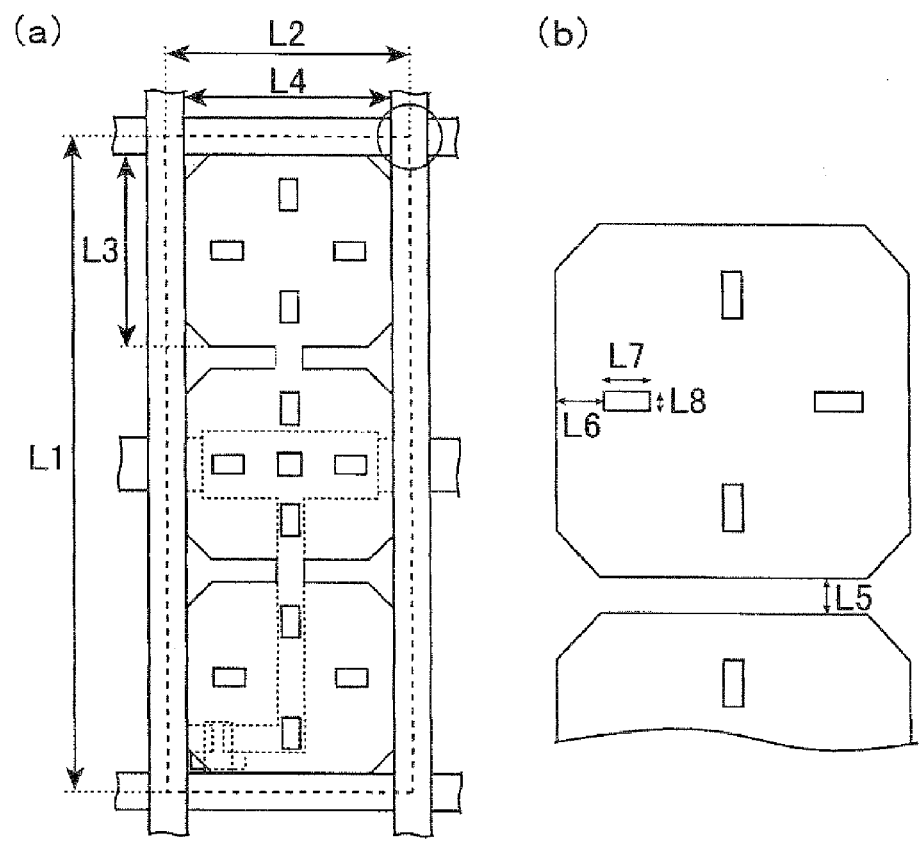
FIGS. 3(a) and 3(b) are plan views schematically showing a size of a pixel electrode of the LCD panel in accordance with Embodiment 1.
Figure 4:
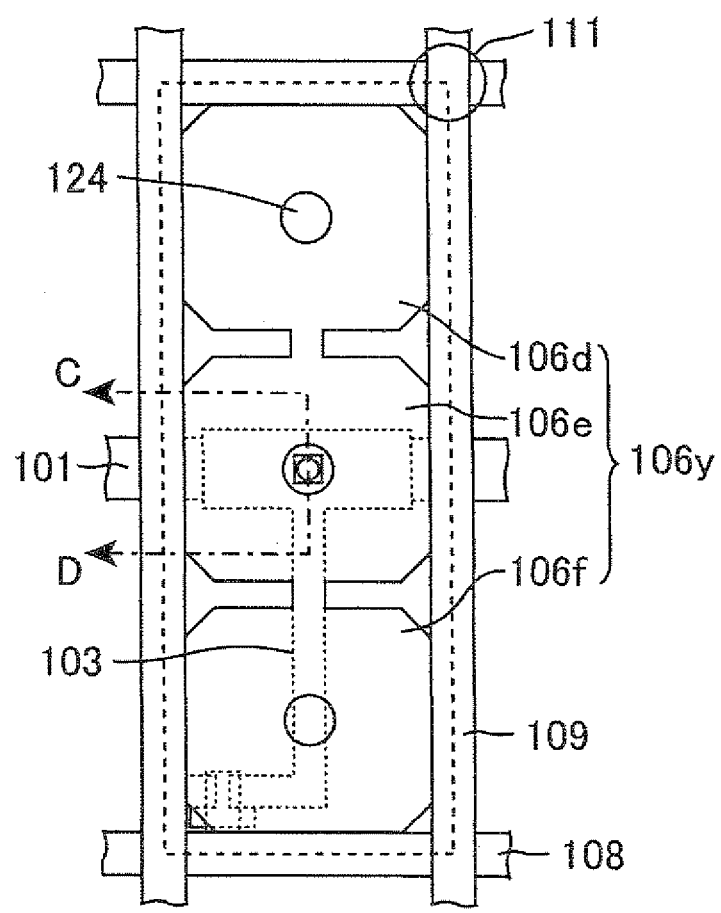
FIG. 4 is a plan view schematically showing a configuration of one pixel of an LCD panel in accordance with Comparative Embodiment 1.
Figure 5:
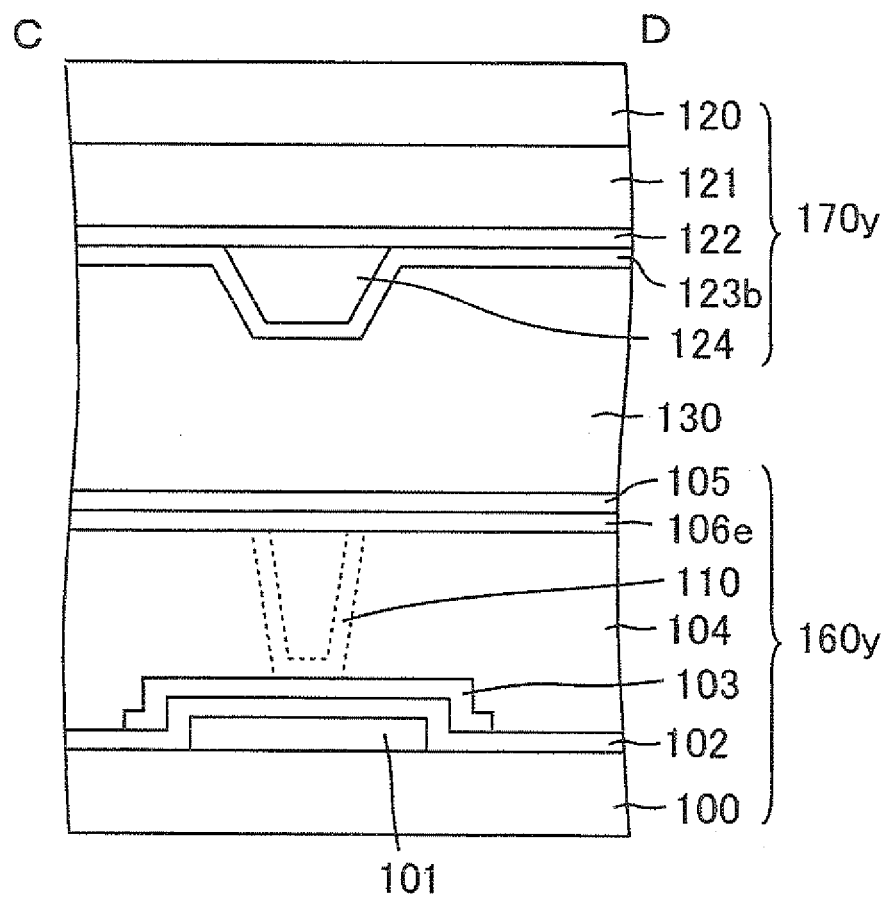
FIG. 5 is a cross-sectional view schematically showing a configuration of the LCD panel in accordance with Comparative Embodiment 1.
Figure 6:
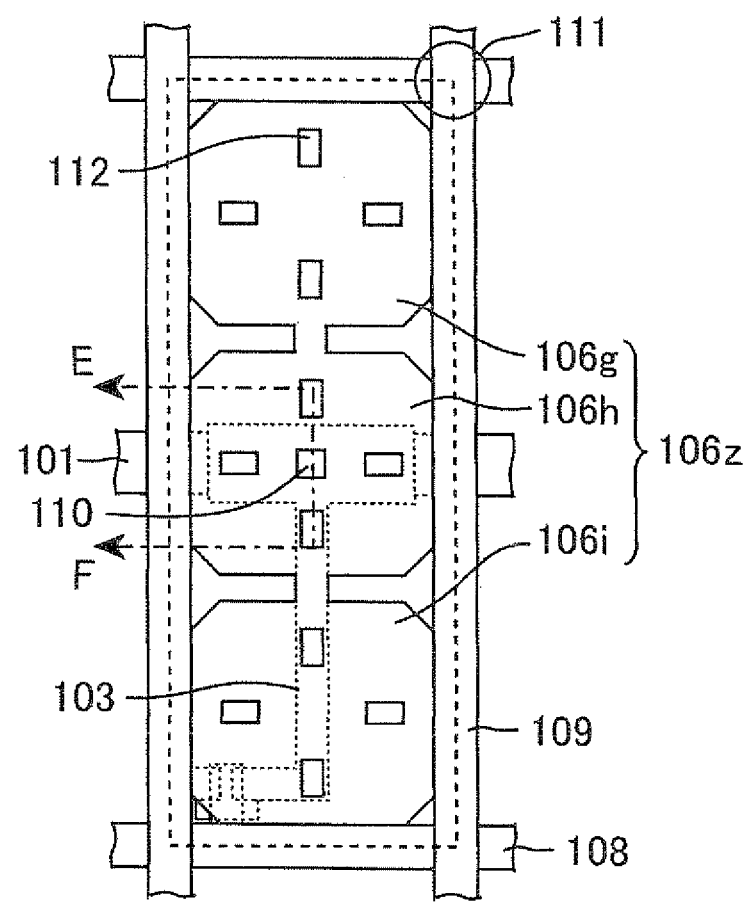
FIG. 6 is a plan view schematically showing a configuration of one pixel of an LCD panel in accordance with Comparative Embodiment 2.
Figure 7:
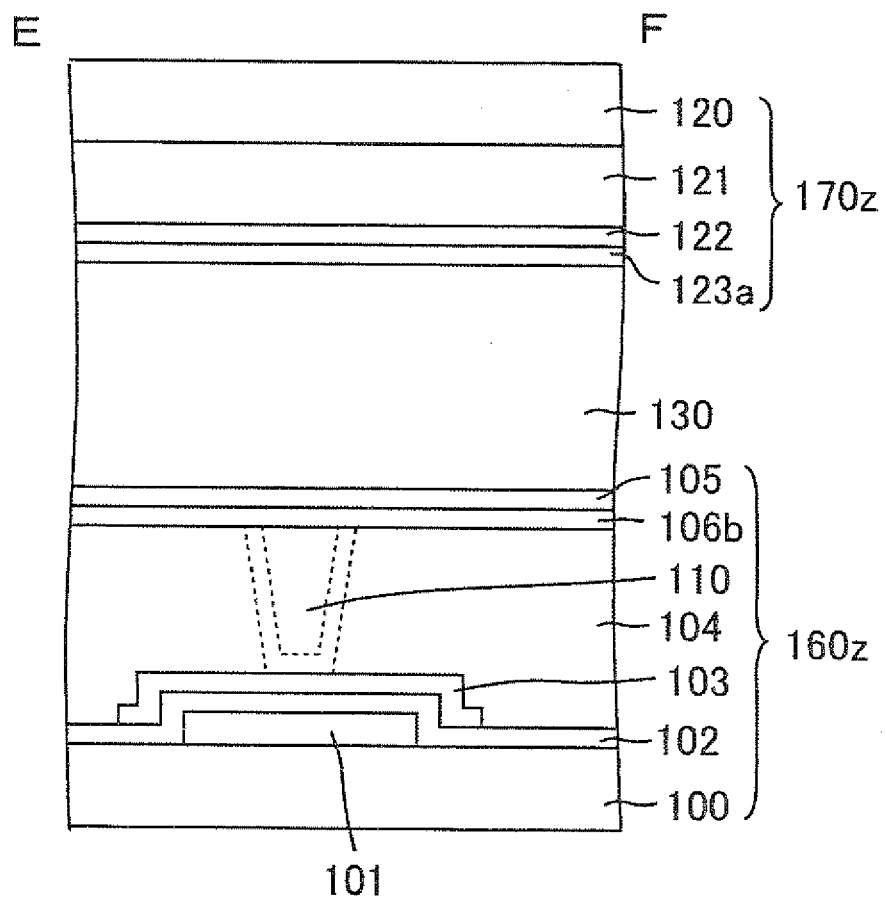
FIG. 7 is a cross-sectional view schematically showing a configuration of the LCD panel in accordance with Comparative Embodiment 2.
Figure 8:
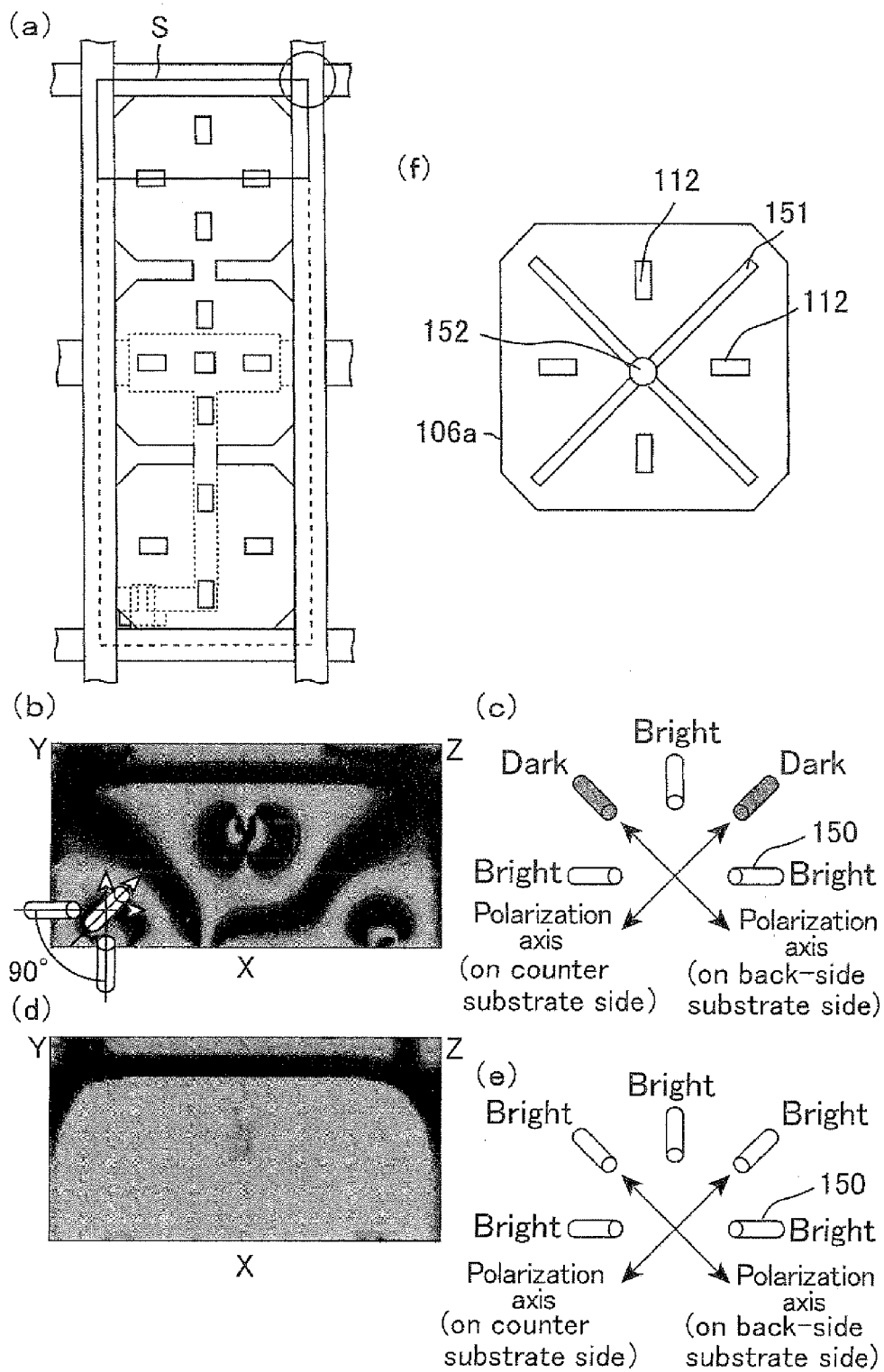
FIG. 8(a) is a plan view schematically showing a configuration of one pixel of an LCD panel in accordance with Embodiment 1.
FIGS. 8(b) and 8(d) are photographs of pixel in the region S shown in FIG. 8(a) under linearly-polarized light and circularly-polarized light, respectively.
FIG. 8(c) is a view showing a relationship between alignment azimuths of liquid crystal molecules and polarization axis azimuths under linearly-polarization light.
FIG. 8(e) is a view showing such a relationship under circularly-polarized light.
FIG. 8(f) is a plan view schematically showing an arrangement relationship between a sub-pixel electrode, and a singular point of pinwheel alignment and dark-line regions.
Figure 9:
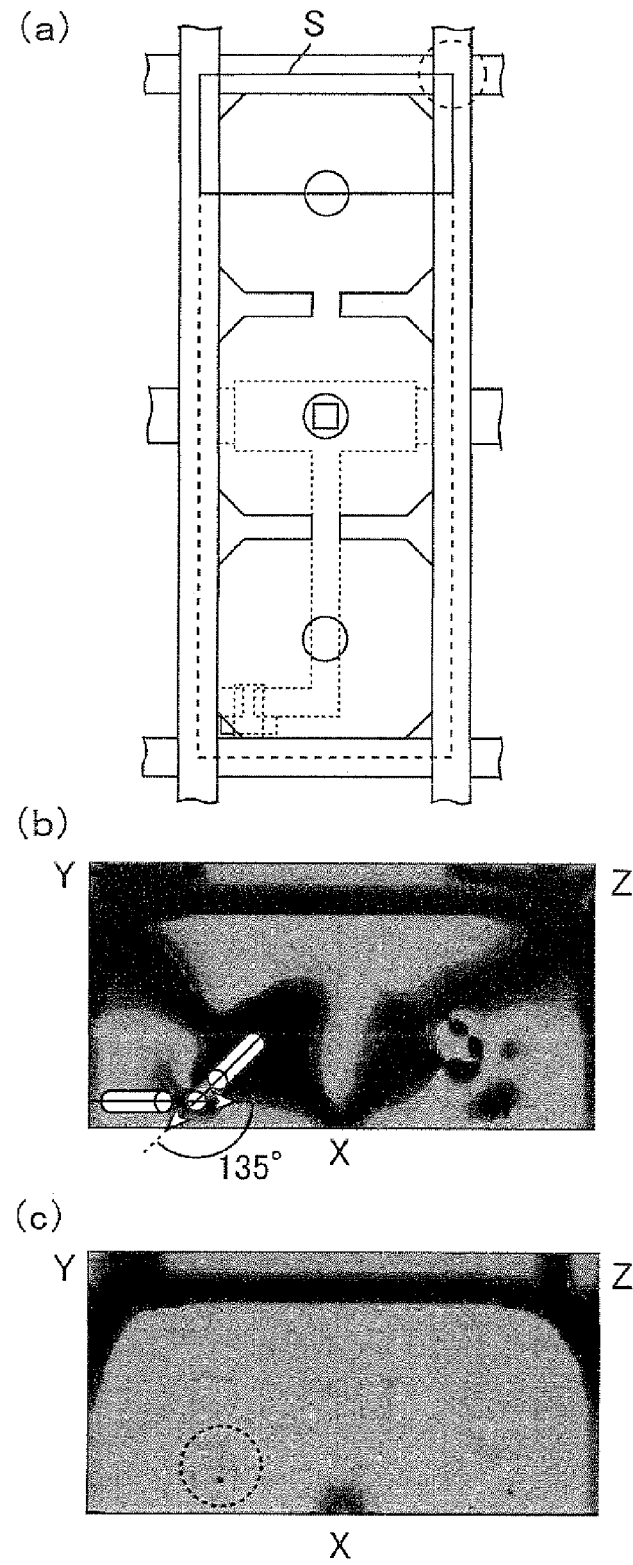
FIG. 9(a) is a plan view schematically showing a configuration of one pixel of the LCD panel in accordance with Comparative Embodiment 1.
FIGS. 9(b) and 9(c) are photographs of pixel in the region S shown in FIG. 9(a) under linearly-polarized light and circularly-polarized light, respectively.
Figure 10:
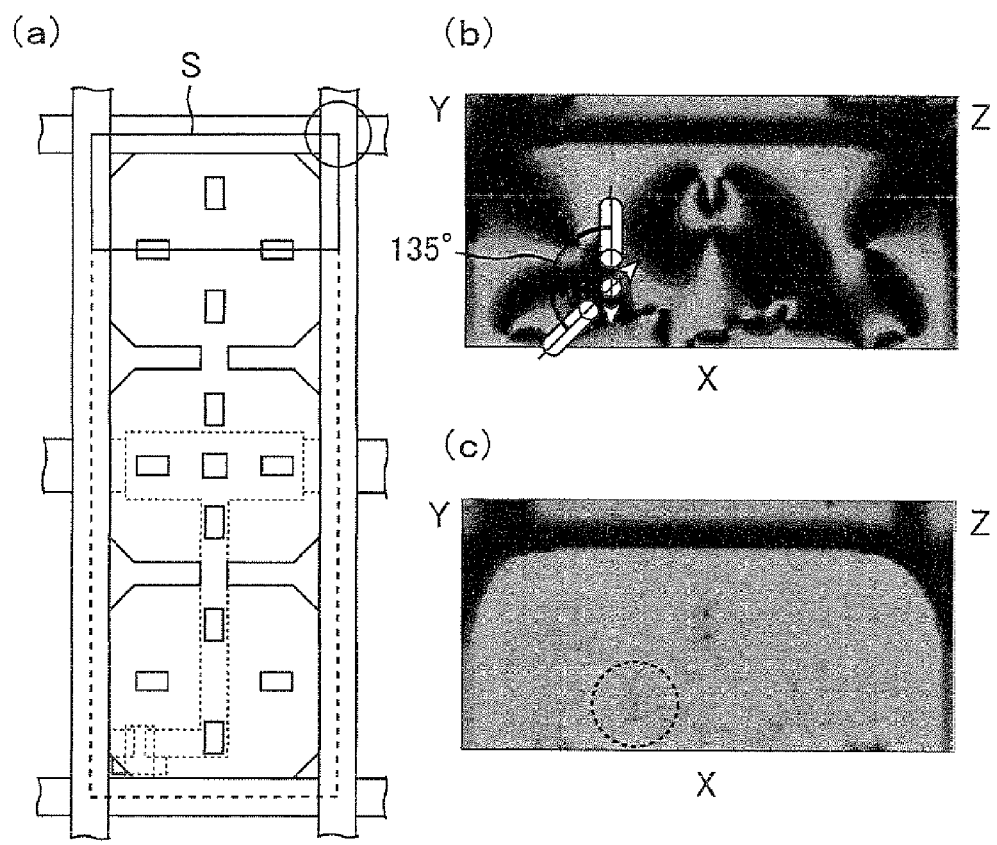
FIG. 10(a) is a plan view schematically showing a configuration of one pixel of an LCD panel in accordance with Comparative Embodiment 2.
FIGS. 10(b) and 10(c) are photographs of pixel in the region S shown in FIG. 10(a) under linearly-polarized light and circularly-polarized light, respectively.

100, 120: Substrate
101: Storage capacitor wiring
102: Gate insulating film
103: Drain wiring
104: Interlayer insulating film
105, 123a, 123b: Vertical alignment film
106x, 106y, 106z: Pixel electrode
106a, 106b, 106c, 106d, 106e, 106f, 106g, 106h, 106i: Sub-pixel electrode
107: Photopolymerized polymer
108: Gate wiring
109: Source wiring
110: Contact hole
111: Photospacer
112: Opening
121: Color filter
122: Counter electrode
124: Alignment control projection
130: Liquid crystal layer
150: Liquid crystal molecule
151: Dark-line region
152: Singular point
160x, 160y, 160z: Back face-side substrate
170x, 170y, 170z: Counter face-side substrate
L1: Length of long side of pixel region
L2: Length of short side of pixel region
L3: Length of long side of sub-pixel electrode
L4: Length of short side of sub-pixel electrode
L5: Width of electrode-free region
L6: Distance between end of sub-pixel electrode to opening
L7: Length of long side of opening
L8: Length of short side of opening

The invention claimed is:

1. A liquid crystal display panel comprising:
a pair of substrates and a liquid crystal layer interposed therebetween,
the liquid crystal layer including liquid crystal molecules with negative dielectric anisotropy,
wherein the pair of substrates each include an electrode,
at least one of the pair of substrates includes a vertical alignment film and a photopolymerized polymer,
the electrode on one of the pair of substrates provides pinwheel alignment of the liquid crystal molecules upon application of a voltage and is provided with first, second, third and fourth openings defined therein for surrounding a singular point of the pinwheel alignment and keeping the singular point within the electrode, each of the first, second, third and fourth openings in the electrode being completely laterally surrounded by the electrode:
gate wirings and source wirings arranged perpendicularly to each other as viewed in plane,
the openings surround the center of the electrode in which the openings are formed, and
wherein the first and second openings make up a first pair of openings, and the third and fourth openings make up a second pair of openings, each of said openings having an elongated shape having its longitudinal direction aligned toward the center of the electrode, and wherein the longitudinal direction of the first pair of openings is aligned at an azimuth parallel to the gate wirings and the longitudinal direction of the second pair of openings is aligned at an azimuth parallel to the source wirings.

2. The liquid crystal display panel according to claim 1, wherein the electrode on the other substrate of the pair of substrates is provided with no openings and no alignment control projections formed thereon.

3. The liquid crystal display panel according to claim 1, wherein the liquid crystal layer has dark-line regions at azimuths where alignment vector of the liquid crystal molecules is parallel and perpendicular to a polarization axis of linearly-polarized light, the polarization axis being at 45° or 135° azimuth with respect to the gate or source wirings, and
the openings are formed at positions corresponding to a space between the dark-line regions when the panel is viewed in plane.

4. The liquid crystal display panel according to claim , wherein the openings are formed in a region other than an end of the electrode.

5. The liquid crystal display panel according to claim 1, wherein the elongated shape is a rectangular shape.

6. The liquid crystal display panel according to claim 5, wherein a length of a short side of the rectangular shape is 5 um or larger.

7. The liquid crystal display panel according to claim 1, wherein the electrode provided with the openings is a sub-pixel electrode formed by dividing a pixel electrode.

8. The liquid crystal display panel according to claim 7, wherein the sub-pixel electrode is formed by dividing a long side of the pixel electrode.

9. The liquid crystal display panel according to claim 7, wherein the sub-pixel electrode has an octagonal shape.

10. The liquid crystal display panel according to claim 1, wherein the photopolymerized polymer is formed by photo-polymerizing monomers that have been dispersed into the liquid crystal layer under application of a voltage to the liquid crystal layer.

11. A liquid crystal display device comprising the liquid crystal display panel of claim 1.

12. The liquid crystal display panel according to claim 1, wherein the elongated shape is an elliptical shape.

13. The liquid crystal display panel according to claim 1, wherein the elongated shape is a trapezoidal shape with a height larger than its upper and lower bases.

14. The liquid crystal display panel according to claim 1, further comprising a transistor and a contact hole, wherein the contact hole connects the electrode in which the openings are formed and the transistor, and a position of the contact hole overlaps with a position of the singular point as viewed in plane.

* * * * *

UNITED STATES PATENT AND TRADEMARK OFFICE
CERTIFICATE OF CORRECTION

PATENT NO.         : 8,610,653 B2
APPLICATION NO.    : 12/679607
DATED              : December 17, 2013
INVENTOR(S)        : Tashiro et al.

It is certified that error appears in the above-identified patent and that said Letters Patent is hereby corrected as shown below:

In the Claims

Claim 4, column 22, line 7, the number -- 1 -- should be inserted after the word -- claim --.

Signed and Sealed this
Twenty-second Day of April, 2014

Michelle K. Lee
*Deputy Director of the United States Patent and Trademark Office*